(No Model.)  2 Sheets—Sheet 1.
N. N. HORTON.
BICYCLE.
No. 465,136.  Patented Dec. 15, 1891.
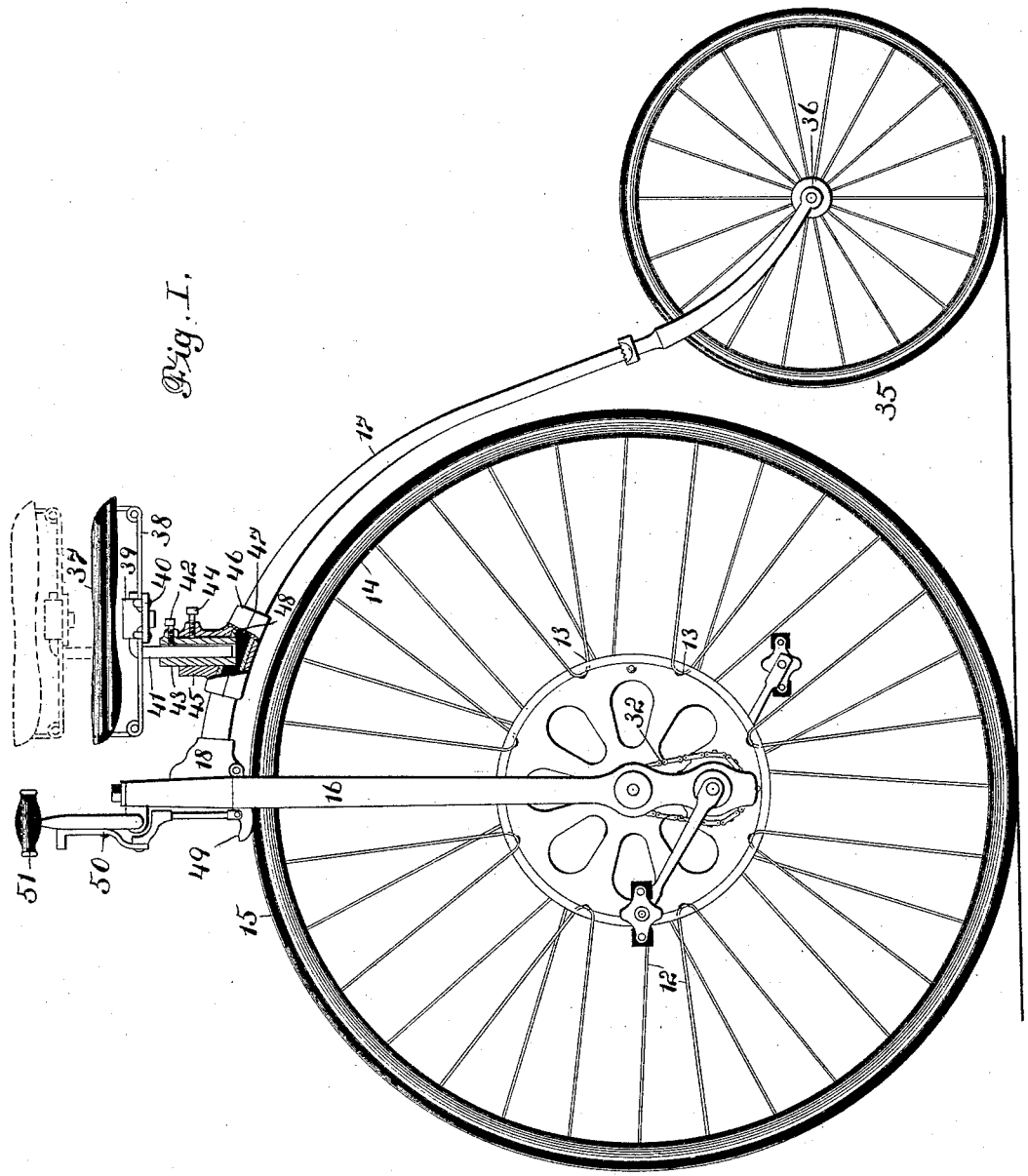
Fig. I.
Witnesses:
F. G. Fischer
George E. Cruse
Inventor:
N. N. Horton.
By Knight Bros.
Attys.

(No Model.) 2 Sheets—Sheet 2.
N. N. HORTON.
BICYCLE.
No. 465,136. Patented Dec. 15, 1891.
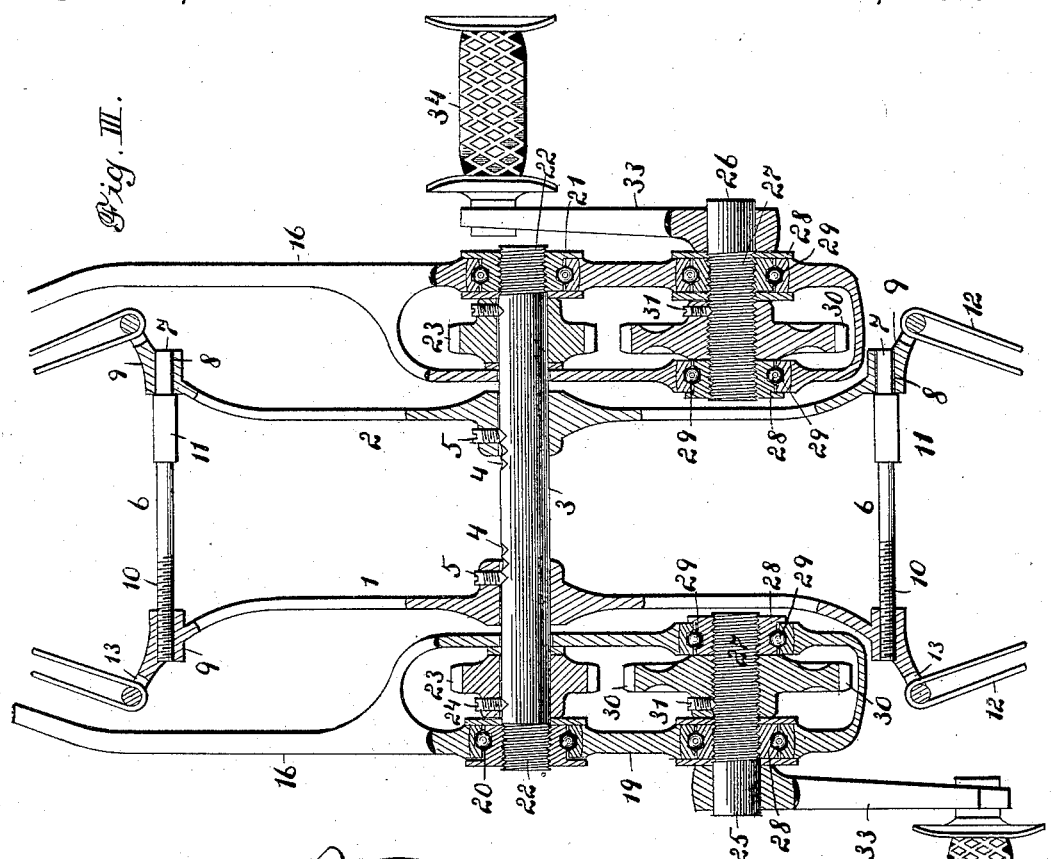
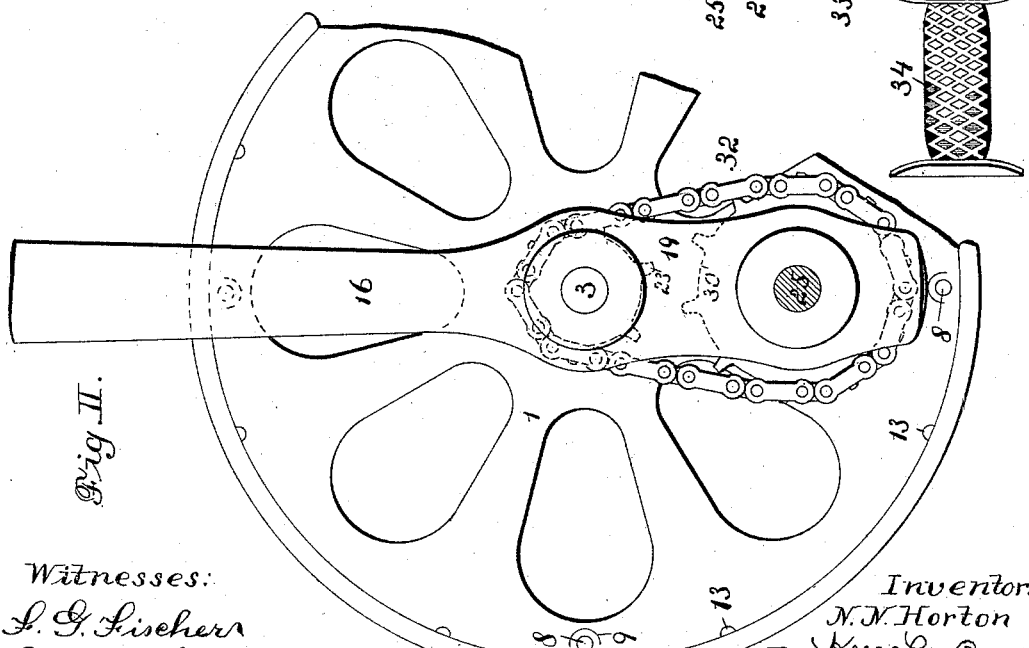
Witnesses:
I. G. Fischer
George E. Cruse
Inventor:
N. N. Horton
By Knight Bros.
Attys.

UNITED STATES PATENT OFFICE.

NUMON N. HORTON, OF KANSAS CITY, MISSOURI.

BICYCLE.

SPECIFICATION forming part of Letters Patent No. 465,136, dated December 15, 1891.

Application filed February 24, 1891. Serial No. 382,483. (No model.)

*To all whom it may concern:*

Be it known that I, NUMON N. HORTON, of Kansas City, in the county of Jackson and State of Missouri, have invented certain new and useful Improvements in Bicycles, of which the following is a full, clear, and exact description, reference being had to the accompanying drawings, which form a part of this specification.

My invention relates to certain new and useful improvements in bicycles; and my invention consists in features of novelty hereinafter described, and pointed out in the claims.

Figure I represents a side elevation of my improved bicycle. Fig. II is an enlarged detail side elevation showing my improved hub and gear. Fig. III is an enlarged detail transverse section showing hub, gearing, &c.

Referring to the drawings, 1 2 represents my improved hub, having adjustable connection with the axle 3 by means of notches or grooves 4 and set-screws 5, whereby the different sections of said hub may be adjusted at will on the axle. Near the outer periphery of the hub I place a series of spreaders 6, the ends 7 of which are non-threaded and work in an opening 8 in the flange 9 of the section 2 of the hub. The opposite ends of the spreaders 6 are screw-threaded, as shown at 10, which engage in a screw-threaded opening in the flange 9 on the section 1 of the hub.

11 represents a section of the spreaders, having a square or other face, to which a wrench can be readily applied in order to adjust the sections of the hub laterally. After the same have been adjusted to the desired point, in order to create a sufficient tension on the spokes 12, the sections of the hub are secured at the proper point on the axle 3 by means of the set-screws 5. The inner ends of the spokes 12 are secured to the flange 9 of the hub by passing through openings 13 in the same, the outer ends of said spokes being secured to the rim 14 in a suitable manner, after which the tire 15 is placed in position.

16 represents the fork which supports the upper end of the backbone 17, the same being connected thereto by a head 18. The lower portion of the fork 16 is provided with a loop portion 19, in which the axle 3 is journaled by means of ball-bearings 20 in cases 21, into which the axle is screwed, as shown at 22.

23 represents sprocket-gears on the axle 3, which are secured thereto by set-screws 24. Near the lower ends of the loops 19 in the fork 16 the crank-shaft is journaled, said crank-shaft being in sections 25 26 on each side of the hub. The crank-shafts are threaded, as shown at 27, and are screwed into casings 28, having ball-bearings 29, said casings being supported by the fork. Between said casings on the crank-shaft are secured sprocket-gears 30 by means of set-screws 31. The sprocket-gears 30 on the crank-shafts 25 26 are connected with the smaller sprocket-gear 23 on the axle 3 by means of sprocket-chains 32.

33 represents the cranks, secured near the outer ends of the crank-shafts 25 26.

34 represents the pedals, which are secured to the outer end of the cranks 33.

35 represents the guiding-wheel, which is secured to the lower end of the backbone in the usual manner, as shown at 36.

37 represents the saddle, having a saddle-spring 38, said spring being secured to a clamp 39, as shown at 40. The clamp 39 is secured to a post or standard 41, said post being adjustably secured by a set-screw 42 to a sleeve 43. The sleeve 43 is in turn adjustably secured by a set-screw 44 to a socket 45, said socket 45 being a portion of a clamp 46, which is secured to the backbone, as shown at 47, the backbone having an opening therein to admit the lower end of the post 41 and sleeve 43, as shown at 48.

It will be seen that by the means described the saddle can be adjusted in the sleeve and the sleeve may be adjusted in its socket, thus permitting the saddle to be extended or lowered to a considerable degree without having any great length of post.

49 represents the brake-shoe, operated by the usual lever 50, 51 representing the handle.

By means of my divided crank-shaft I am enabled to secure the pedals at a much lower point than if they were secured to the axle, and by the gearing as described I am enabled to obtain a greater amount of speed with a wheel of smaller diameter than if the pedals were secured directly to the axle.

By means of my adjustable spreaders, of which there may be any desired number, I am enabled to adjust my hub laterally and form any tension desired on the spokes in a very short space of time.

I claim as my invention—

1. As an improved article of manufacture, a bicycle having a fork with loops formed therein on its lower end, an axle journaled in said loops, sprocket-wheels secured to said axle, divided crank-shaft journaled in said loop, sprocket-wheels secured to said crank-shaft, and sprocket-chains for connecting the sprocket-wheels on the divided crank-shaft with said axle, substantially for the purpose set forth.

2. In a bicycle, the combination of the fork 16, having loops 19, casings 21, having ball-bearings 20, supported by the fork 16, axle 3, journaled in said casings, divided crank-shafts 25 26, secured to the casings 28, which are supported on ball-bearings 29 in the fork 16, and means for connecting the crank-shaft with the axle, substantially as described, and for the purpose set forth.

3. In a bicycle, the combination of the fork 16, having loops 19, the axle 3, upon which the wheel is mounted, the casings 21, secured to the ends of said axle and mounted in suitable ball-bearings in the loops 19, sprocket-wheels 23, also secured to said axle 3, the divided crank-shafts 25 26, having screw-threaded portions 27, the casings 28 and sprocket-wheels 30, secured to said screw-threaded portions 27, said casings 28 being mounted in suitable ball-bearings in the lower ends of the loops 19, and sprocket-chains 32, engaging the sprocket-wheels 23 and 30, substantially as herein set forth.

4. As an improved article of manufacture, a bicycle having its saddle secured to a post, said post being adjustably secured to a movable sleeve and said sleeve being adjustably secured to the backbone of the bicycle, substantially as set forth.

5. In a bicycle, the combination of the backbone 17, clamp 46, secured thereto, socket 45 on said clamp, movable sleeve 43, adjustably secured in said socket, a movable post 41, adjustably secured in said sleeve, and a saddle secured to the upper end of said post, substantially as described, and for the purpose set forth.

6. In a bicycle, the combination of the backbone 17, having an opening therein, a clamp 46, surrounding said opening, an adjustable sleeve which may extend into said opening and connected with said clamp, a post adjustably connected with said sleeve, and a saddle secured to said post, substantially as described, and for the purpose set forth.

NUMON N. HORTON.

Witnesses:
JAS. E. KNIGHT,
F. E. MULLETT.